US012588037B2

(12) United States Patent
Hu et al.

(10) Patent No.: US 12,588,037 B2
(45) Date of Patent: Mar. 24, 2026

(54) METHODS AND DEVICES FOR CHANNEL OCCUPANCY TIME (COT) SHARING

(71) Applicant: Samsung Electronics Co., Ltd., Gyeonggi-do (KR)

(72) Inventors: Liang Hu, San Diego, CA (US); Philippe Sartori, Naperville, IL (US); Yaser Mohamed Mostafa Kamal Fouad, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 696 days.

(21) Appl. No.: 17/943,844

(22) Filed: Sep. 13, 2022

(65) Prior Publication Data

US 2023/0106442 A1 Apr. 6, 2023

Related U.S. Application Data

(60) Provisional application No. 63/252,421, filed on Oct. 5, 2021.

(51) Int. Cl.
*H04W 72/25* (2023.01)
*H04W 72/02* (2009.01)
(Continued)

(52) U.S. Cl.
CPC .......... *H04W 72/25* (2023.01); *H04W 72/02* (2013.01); *H04W 72/40* (2023.01);
(Continued)

(58) Field of Classification Search
CPC ..... H04W 72/20; H04W 72/25; H04W 72/40; H04W 28/0875
See application file for complete search history.

(56) References Cited

U.S. PATENT DOCUMENTS 10,356,803 B2 7/2019 Kim et al.
10,667,119 B2 5/2020 Loehr et al.
(Continued)

FOREIGN PATENT DOCUMENTS

WO WO 2021/034628 2/2021

OTHER PUBLICATIONS

European Telecommunications Standards Institute (ETSI). ETSI TS 138 300 V18.1.0 (May 2024). May 2024. ETSI, www.etsi.org/deliver/etsi_ts/138300_138399/138300/18.01.00_60/ts_138300v180100p.pdf.*

(Continued)

*Primary Examiner* — Brendan Y Higa
(74) *Attorney, Agent, or Firm* — The Farrell Law Firm, P.C.

(57) ABSTRACT

Methods and systems are provided in which a channel occupancy time (COT)-sharing indicator is received, at a first user equipment (UE), from a second UE. The first UE determines whether the first UE is able to use a time-frequency resource within a frequency range indicated by the COT-sharing indicator received from the second UE. In case that the first UE is able to use a time-frequency resource within the frequency range, data is transmitted with COT-sharing between the first UE and the second UE. In case that the first UE is unable to use a time-frequency resource within the frequency range, the data is transmitted without COT-sharing in a first resource selected by the first UE.

18 Claims, 10 Drawing Sheets

(51) Int. Cl.

| | |
|---|---|
| *H04W 72/0446* | (2023.01) |
| *H04W 72/0453* | (2023.01) |
| *H04W 72/40* | (2023.01) |
| *H04W 74/00* | (2009.01) |
| *H04W 74/0808* | (2024.01) |

(52) U.S. Cl.

CPC ..... *H04W 74/002* (2013.01); *H04W 74/0808* (2013.01); *H04W 72/0446* (2013.01); *H04W 72/0453* (2013.01)

(56) References Cited

U.S. PATENT DOCUMENTS

| | | | | |
|---|---|---|---|---|
| 11,483,803 | B2 * | 10/2022 | Xue | H04B 1/7143 |
| 11,672,034 | B2 * | 6/2023 | Sun | H04W 74/0875 |
| | | | | 370/329 |
| 2021/0092783 | A1 * | 3/2021 | Sun | H04W 74/0875 |
| 2021/0195637 | A1 * | 6/2021 | Xue | H04W 74/0808 |
| 2021/0195649 | A1 * | 6/2021 | Xue | H04W 72/20 |
| 2021/0219283 | A1 * | 7/2021 | Xue | H04W 28/26 |
| 2022/0021508 | A1 | 1/2022 | Xue et al. | |
| 2022/0061095 | A1 * | 2/2022 | Xue | H04W 80/02 |
| 2022/0070921 | A1 * | 3/2022 | Xue | H04W 72/044 |
| 2022/0078845 | A1 * | 3/2022 | Xu | H04L 5/0053 |
| 2022/0141873 | A1 * | 5/2022 | Uziel | H04W 72/20 |
| | | | | 370/329 |
| 2022/0167402 | A1 * | 5/2022 | Liu | H04W 28/04 |
| 2022/0167407 | A1 * | 5/2022 | Oviedo | H04W 72/0446 |
| 2022/0248384 | A1 * | 8/2022 | Sun | H04W 72/02 |
| 2022/0417988 | A1 * | 12/2022 | Wang | H04W 72/25 |
| 2023/0030900 | A1 * | 2/2023 | Xue | H04W 4/70 |
| 2023/0070908 | A1 * | 3/2023 | Kang | H04W 28/0231 |
| 2023/0209596 | A1 * | 6/2023 | Wu | H04W 72/02 |
| | | | | 370/329 |
| 2023/0232431 | A1 * | 7/2023 | Wu | H04W 72/40 |
| | | | | 370/329 |
| 2023/0269772 | A1 * | 8/2023 | Chen | H04W 74/0808 |
| | | | | 370/329 |
| 2023/0328784 | A1 * | 10/2023 | Lei | H04W 72/25 |
| | | | | 370/329 |
| 2023/0345529 | A1 * | 10/2023 | Van Phan | H04W 74/002 |
| 2024/0064713 | A1 * | 2/2024 | Sun | H04W 72/25 |
| 2024/0196433 | A1 * | 6/2024 | Ji | H04W 74/0808 |
| 2024/0340954 | A1 * | 10/2024 | Yang | H04W 74/0866 |
| 2024/0349340 | A1 * | 10/2024 | Chen | H04L 27/2605 |
| 2024/0357652 | A1 * | 10/2024 | Chen | H04W 74/0816 |
| 2024/0389148 | A1 * | 11/2024 | Zhao | H04W 72/0446 |
| 2025/0331003 | A1 * | 10/2025 | Chien | H04W 74/0808 |

OTHER PUBLICATIONS

3GPP TS 38.214 V16.7.0 (Sep. 2021)Technical Specification 3rd Generation Partnership Project; Technical Specification Group Radio Access Network; NR; Physical layer . . . procedures for data (Release 16), pp. 172.

European Search Report dated Feb. 2, 2023 issued in counterpart application No. 22199530.1-1215, 10 pages.

\* cited by examiner

Time N

METHODS AND DEVICES FOR CHANNEL OCCUPANCY TIME (COT) SHARING

CROSS-REFERENCE TO RELATED APPLICATION

This application claims the priority benefit under 35 U.S.C. § 119(e) of U.S. Provisional Application No. 63/252,421, filed on Oct. 5, 2021, the disclosure of which is incorporated by reference in its entirety as if fully set forth herein.

TECHNICAL FIELD

The disclosure generally relates to channel occupancy time (COT)-sharing methods. More particularly, the subject matter disclosed herein relates to improvements to channel access COT-sharing methods for new radio (NR) sidelink (SL) in an unlicensed band.

SUMMARY

Up to Rel-17, 3$^{rd}$ generation partnership project (3GPP) SL specifications focused on public safety and vehicle to vehicle (V2V) communications over an intelligent transport system (ITS) band. However, many interactive services that are local in nature benefit from the integration of cellular communications with SL communications.

An unlicensed band in a 5/6 gigahertz (GHz) band and a 60 GHz band provides a large additional bandwidth and flexibility to allow for SL data transmission. However, SL communication presents unique challenges in an unlicensed band.

Resource allocation for SL, as standardized in NR, relies on a form of sensing that detects control channel information from other SL user equipments (UEs). Specifically, in order to operate in an unlicensed band, where the band can be accessed by multiple types of devices (e.g., WiFi devices), the sensing performed by the SL UE relies on energy detection (e.g., listen before talk (LBT)).

However, when performing LBT, a UE may acquire a channel for a time that is longer than the UE requires. Under some conditions, another UE can use the remainder of the COT without having to perform LBT itself. While this COT-sharing procedure may be performed with a central controller (e.g., a g-node B (gNB)), the extension of this procedure to a fully distributed system requires modifications to existing COT-sharing protocols. For example, the resource allocation procedure works with a slot granularity, but LBT may be completed before or after the slot boundary causing a UE to lose a channel.

Herein, different COT-sharing options are provided for unicast, groupcast, and broadcast SL communications in an unlicensed band. An SL COT indicator format and signaling methods are disclosed as well as SL COT-sharing rules for unicast, groupcast, and broadcast SL communications. Once an SL UE acquires channel access after successful LBT, the SL UE may share the COT with other SL UEs.

In an embodiment, a method includes receiving a COT-sharing indicator, at a first UE, from a second UE. The first UE determines whether the first UE is able to use a time-frequency resource within a frequency range indicated by the COT-sharing indicator received from the second UE. In case that the first UE is able to use the time-frequency resource within the frequency range, data is transmitted with COT-sharing between the first UE and the second UE. In case that the first UE is unable to use the time-frequency resource within the frequency range, the data is transmitted without COT-sharing in a first resource selected by the first UE.

In an embodiment, a UE includes a processor and a non-transitory computer readable storage medium storing instructions. When executed, the instructions cause the processor to receive a COT-sharing indicator from a second UE. The instructions also cause the processor to determine whether the first UE is able to use a time-frequency resource within a frequency range indicated by the COT-sharing indicator received from the second UE. In case that the first UE is able to use a time-frequency resource within the frequency range, the instructions cause the processor to transmit data with COT-sharing between the first UE and at least the second UE. In case that the first UE is unable to use a time-frequency resource within the frequency range, the instructions cause the processor to transmit the data without COT-sharing in a first resource selected by the first UE.

In an embodiment, a system includes a first UE including a first processor configured to transmit a COT-sharing indicator to one or more other UEs in SL. The system also includes a second UE including a second processor configured to receive the COT-sharing indicator from the first UE. The second processor is also configured to determine whether the first UE is able to use a time-frequency resource within a frequency range indicated by the COT-sharing indicator received from the second UE. In case that the first UE is able to use a time-frequency resource within the frequency range, the second processor is configured to transmit data with COT-sharing between the first UE and at least the second UE. In case that the first UE is unable to use a time-frequency resource within the frequency range, the second processor is configured to transmit the data without COT-sharing in a resource selected by the first UE.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1:
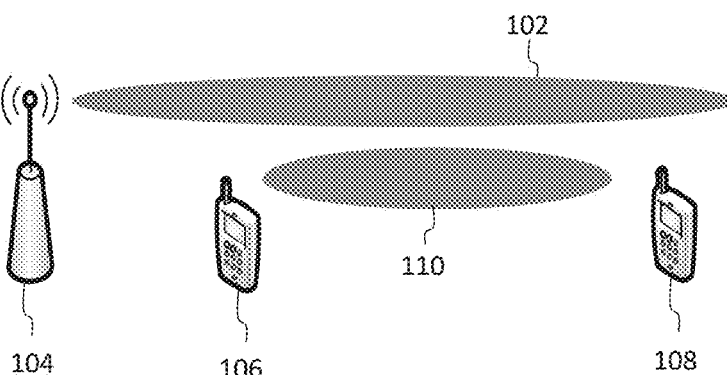
FIG. 1 is a diagram illustrating a communication system, according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

FIG. 1 is a diagram illustrating a communication system, according to an embodiment. In the architecture illustrated in FIG. 1, a control path 102 enables the transmission of control information through a network established between a gNB 104, a first UE 106, and a second UE 108. A data path 110 enables the transmission of data (and some control information) on an SL between the first UE 106 and the second UE 108. The control path 102 and the data path may be on the same frequency or may be on different frequencies.

Figure 2:
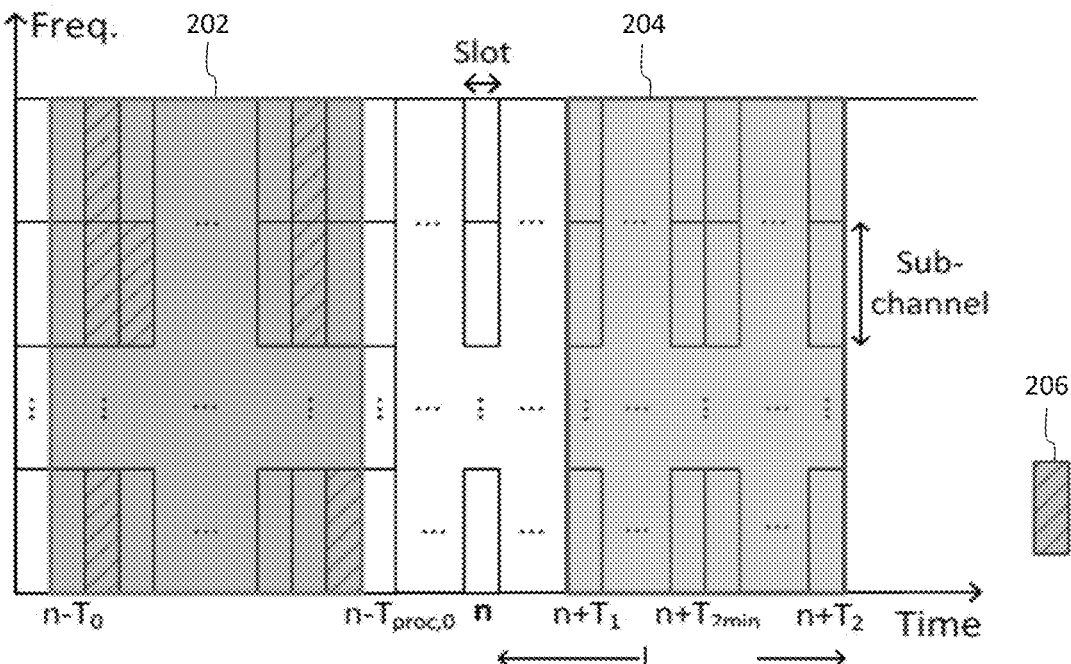
FIG. 2 is a diagram illustrating a sensing-based resource selection procedure, according to an embodiment.

FIG. 2 is a diagram illustrating a sensing-based resource selection procedure, according to an embodiment. Specifically, FIG. 2 relates to a NR SL mode-2 resource allocation procedure of 3GPP Rel-16 (TS 38.214). The procedure is composed of two stages: a sensing procedure; and a resource selection procedure. The sensing procedure identifies resources that are candidates for resource selection, and is based on the decoding of 1st-stage-SL control information (SCI) received from surrounding UEs, and based on SL power measurements in terms of reference signal received power (RSRP). An SL UE performs the sensing procedure during a sensing window 202, which is defined by a pre-configured parameter $T_0$ and a UE-specific parameter $T_{proc,0}$, which accounts for the time required to complete SCI decoding and possibly perform measurements on a demodulation reference signal (DMRS) for the sensing procedure. Specifically, if at time n, sensing-based resource selection is triggered, the UE considers SL measurements performed during the interval $[n-T_0, n-T_{proc,0}]$. SL RSRP measurements can be computed using a power spectral density of a signal received in a physical SL control channel (PSCCH) or in a physical SL shared channel (PSSCH), for which the UE has successfully decoded the $1^{st}$-stage-SCI. PSCCH RSRP and PSSCH RSRP are defined as a linear average over power contributions (in Watts) of resource elements (REs) that carry DMRS associated with PSCCH and PSSCH, respectively.

Specifically, candidate resources within the resource selection window 204 are identified. A resource is indicated as a non-candidate resource 206 if an SCI is received on that slot or the corresponding slot is reserved by a previous SCI, and the associated SL RSRP measurement is above an SL RSRP threshold. The resulting set of candidate resources within the resource selection window 204 should be at least a threshold percent of the total resources within the resource selection window 204 in order to proceed with the second step of resource selection. The value of threshold percent is configured by RRC and may be, for example, 20%, 35% or 50%. If this condition is not met, the RSRP threshold may be increased by 3 dB and the procedure is repeated.

As shown in FIG. 2, the resource selection window 204 is defined by the interval $[n+T_1, n+T_2]$, where $T_1$ and $T_2$ are parameters that are determined by UE implementation. $T_2$ depends on a packet delay budget (PDB) and on a radio resource control (RRC) pre-configured parameter referred to as $T_{2,min}$. When PDB>$T_{2,min}$, $T_2$ is determined by the UE implementation and must meet the condition of $T_{2,min} \leq T_2 \leq PDB$. When PDB≤$T_{2,min}$, $T_2$=PDB. $T_1$ is selected so that $T_{proc,1} \leq T_1$, where $T_{proc,1}$ is the time required to identify the candidate resources and select a subset of resources for SL transmission. The resource selection procedure is composed of two steps.

The SL UE performs resource selection from the identified candidate resources (which may include initial transmissions and retransmissions). A randomized resource selection from the identified candidate resources in the resource selection window 204 is supported. To exclude resources from the candidate pool based on SL measurements in previous slots, the resource reservation period (transmitted by the UEs in the 1st-stage-SCI) is introduced. Since only the periodicity of transmissions can be extracted from the SCI, the UE that performs resource selection uses this periodicity (if included in the decoded SCI) and assumes that the UE(s) that transmitted the SCI will do periodic transmissions with such a periodicity, during Q periods. This allows for the identification and exclusion of non-candidate resources of the resource selection window 104.

In sensing-based resource allocation, a higher layer can request a UE to determine a subset of resources from which the higher layer will select resources for PSSCH/PSCCH transmission.

3GPP has specified four LBT categories for NR-unlicensed (NR-U) single channel access.

A first category (Cat-1 LBT) provides for immediate transmission after a short switching gap of 16 μs.

A second category (Cat-2 LBT) provides for LBT without random back-off, in which a clear channel assessment (CCA) period is deterministic (e.g., fixed to 25 μs).

A third category (Cat-3 LBT) provides for LBT with random back-off with a contention window of a fixed size, in which the extended CCA period is drawn by a random number within the fixed contention window.

A fourth category (Cat-4 LBT) provides for LBT with random back-off with a contention window of variable size, in which the extended CCA period is drawn by a random number within the contention window, whose size can vary based on channel dynamics.

After a successful LBT, a device can access a channel for a duration of a maximum channel occupancy time (MCOT) (e.g., 9 ms in the 60 GHz band). An NR frame structure inherently allows NR-U to transmit and receive in a more efficient manner compared to LTE in unlicensed spectrum technologies, due to the numerologies, mini-slots, and flexible slot structure.

Once an SL UE has acquired channel access, after successful Cat-4 LBT, it can share its COT with one or more other SL UEs. The SL UE that acquires channel access may be referred to as an initiator UE, and the one or more other SL UE(s) that use the shared COT may be referred to as target UE(s). The COT sharing between SL UEs can take place in SL unicast, groupcast, and broadcast communication modes.

Figure 3:
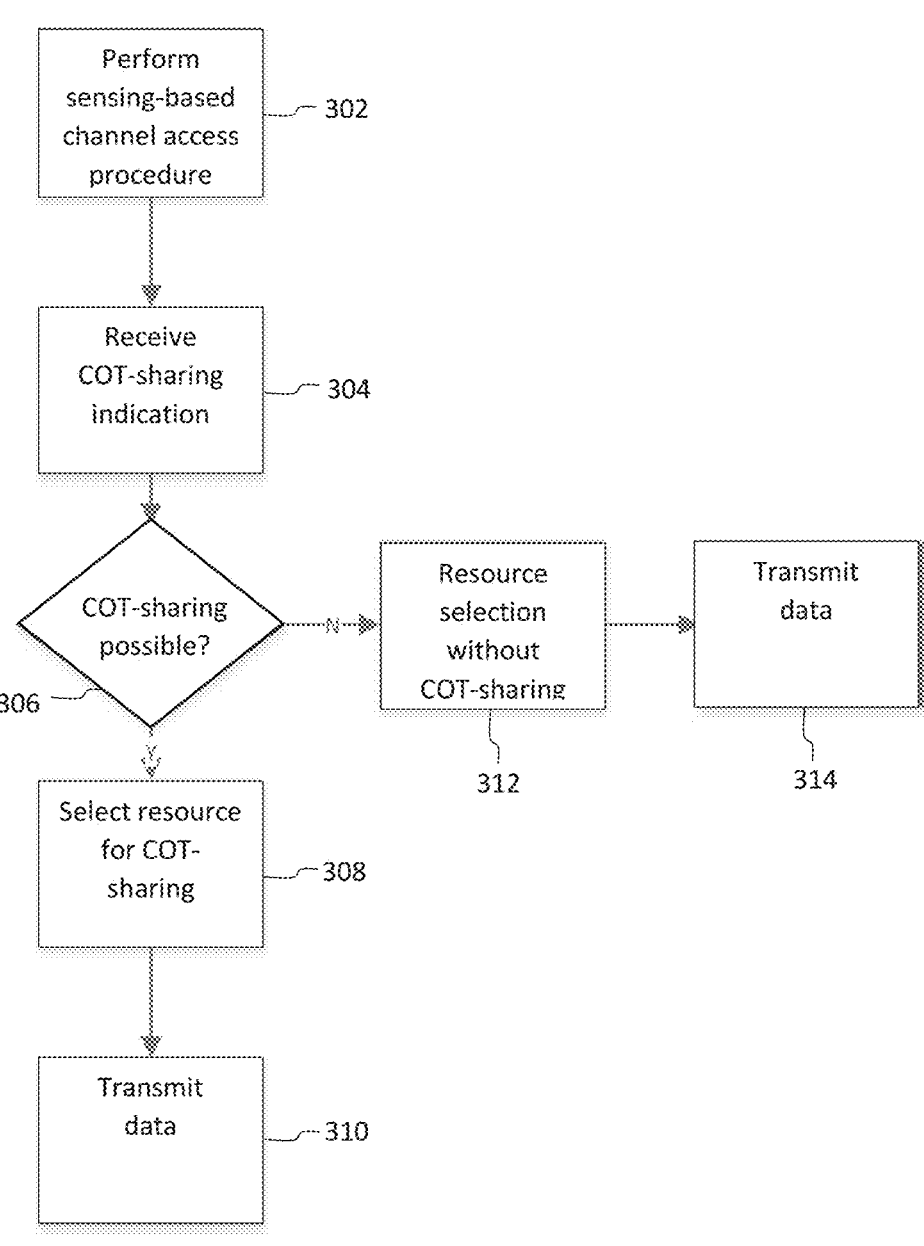
FIG. 3 is a diagram illustrating a method for COT-sharing, according to an embodiment.

FIG. 3 is a diagram illustrating a method for COT-sharing, according to an embodiment. At 302, a target UE performs a sensing-based channel access procedure (e.g., NR SL mode-2 resource allocation procedure), as described above in FIG. 2. Generally, for COT-sharing scenarios, if a UE transmits data due to COT-sharing, the data transmission should occur during the resource selection window so that the resource selection procedure is not excessively affected.

At 304, the target UE receives a COT-sharing indication from an initiator UE in an observation window. COT-sharing may be enabled only when a time gap between the COT-sharing indicator from the initiator UE and the scheduled target UE transmission in the resource selection window is less than a threshold (X), or when COT-sharing has a maximum COT duration.

The observation window is dependent on multiple parameters, such as, for example, regulation parameters (9/16/25 μs), implementation parameters for mode-2 sensing ($T_1$/$T_2$/$T_3$), SCI processing time, and other constraints. Generally, the observation window would cover part or all of the sensing window, and most of the resource selection window in the sensing-based resource selection procedure.

At 306, the target UE determines whether COT-sharing is possible based on whether regulatory rules and enhanced mode-2 resource selection aspects are met. Upon the target UE determining that COT-sharing is possible, the target UE determines a resource using COT-sharing at 308, and transmits data using that resource in the resource selection window at 310. Upon the target UE determining that COT-sharing is not possible, the target UE performs resource selection without using COT-sharing at 312, and transmits data using that resource in the resource selection window at 314.

Embodiments are described herein that are differentiated by when the target UE receives the COT-sharing indicator, as well as target UE behaviors after receiving the COT-sharing indicator.

Figure 4:
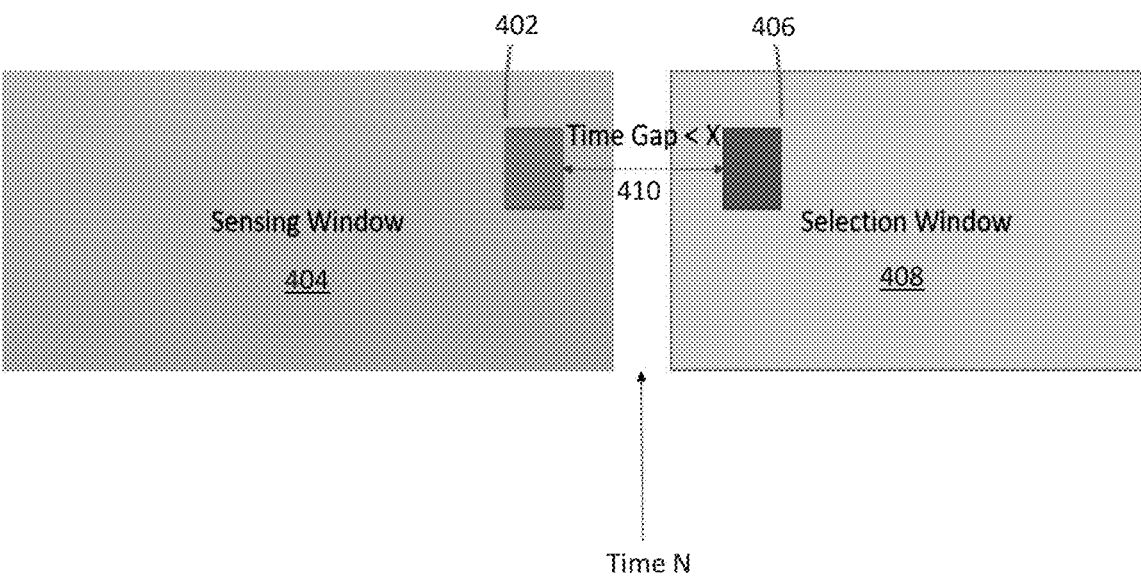
FIG. 4 is a diagram illustrating COT-sharing in which a COT-sharing indicator is received during a sensing window, according to an embodiment.

FIG. 4 is a diagram illustrating COT-sharing in which a COT-sharing indicator is received during a sensing window, according to an embodiment. The sensing window is a sensing-based resource selection procedure sensing window, and the resource selection window is a sensing-based resource selection procedure resource selection window (e.g., NR SL mode-2 resource allocation procedure).

As shown in FIG. 4, a target UE receives a COT-sharing indicator 402 in a sensing window 404. A time gap 410 between the COT-sharing indicator 402 and a scheduled data transmission 406 is less than the threshold (X), and the COT-sharing indicator 402 is thereby received within an observation window, as described above with respect to FIG. 3. If the target UE determines that COT-sharing can be performed, the data transmission 406 is performed in a resource of a resource selection window 408 using COT-sharing.

If the target UE determines that COT-sharing cannot be performed, existing channel access techniques (e.g., Cat-4 LBT) are performed. Thus, COT-sharing is performed if resources that can be shared are part of a preferred resource set identified by the sensing-based resource selection procedures.

Figure 5:
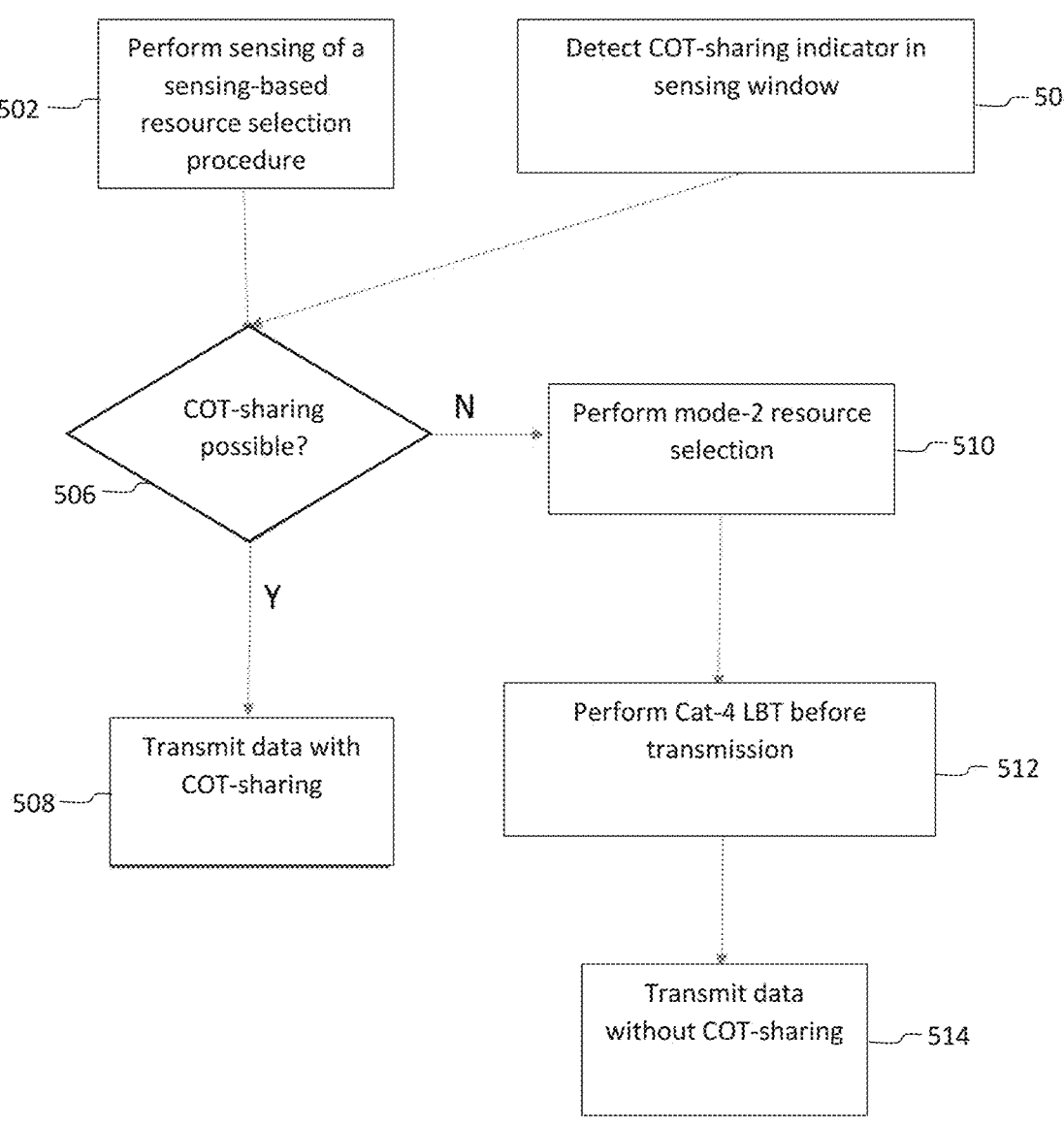
FIG. 5 is a flowchart illustrating a COT-sharing method in which the COT-sharing indicator is received during the sensing window, according to an embodiment.

FIG. 5 is a flowchart illustrating a COT-sharing method in which the COT-sharing indicator is received during the sensing window, according to an embodiment.

At 502, a target UE performs sensing of a sensing-based resource allocation procedure and identifies empty and reserved slots. While possible modifications may be implemented, the procedure may generally follow the sensing procedure described above with respect to FIG. 2.

At 504, the target UE detects a COT-sharing indicator from an initiator UE in a part of a sensing window that is within an observation window. At a 5 or 6 GHz unlicensed band, the target UE that intends to send data to other UEs on the unlicensed band, checks for the reception of at least one COT-sharing indicator from other neighboring initiator UEs in the past observation window. This observation window can be the same or smaller than a mode-2 sensing window for SL mode-2 resource selection. The observation window may also include part of the resource selection window.

The COT-sharing indicator can include a set of time slots that are part of an SL COT duration. This set of time slots are consecutive in the time domain, but not all of these slots can necessarily be used for SL communications, if the configuration of the SL resource pool in this unlicensed band does not allow some slots for SL communications. For example, the COT-sharing indicator may include a starting symbol of the COT within a same slot of receiving the COT-sharing indicator, as well as the number of subsequent slots that are within the COT duration. The COT-sharing indicator may also indicate a last slot within the COT duration, which is shortened to provide an LBT gap for other subsequent transmissions from other neighboring nodes.

The COT-slot indicator may also indicate the number of frequency sub-bands that are part of the COT. For example, one sub-band may have a 20 MHz frequency bandwidth. It may include one or more time slots as set forth in Table 1 below.

The COT-sharing indicator may also indicate one or more LBT modes that can be used by other UEs sharing the COT. The LBT mode can be one-shot short LBT (e.g., Cat-1 LBT). The COT-sharing indicator may be sent by the initiator UE in several ways.

The COT-sharing indicator may be signaled in 1st-stage SCI over PSCCH, which is broadcast to all neighboring UEs. This method is advantageous in that any UE monitoring the PSCCH can obtain the information.

The COT-sharing indicator may be signaled in 2nd-stage SCI over PSSCH, which is either broadcast, group-cast, or unicast only to destination UEs. All UEs that decode the 2nd-stage SCI obtain it. It may be assumed that all UEs are the targets of the 2nd-stage SCI. If the communication is unicast, the UE that receives it may assume that it can share the COT. In case of multicast, the initiator UE that sent the SCI may indicate which UE(s) can share the COT.

The COT-sharing indicator may be sent in a physical SL feedback channel (PSFCH) via a new sequence other than the sequences used for ACK/NACK, via a shifted sequence on PSFCH-like resources, or using a new PSFCH format.

The COT-sharing indicator may be signaled in a physical SL broadcast channel (PSBCH) as part of SL-master information block (MIB) information that is broadcast to all neighboring UEs.

The COT-sharing indicator may be sent in a medium access control (MAC) control element (CE), or an RRC message.

A COT may cover multiple slots. The COT-sharing indicator may be signaled only once when channel access is successful. Alternatively, the COT-sharing indicator may be signaled periodically during a lifetime of the COT duration, whereby each COT-sharing indicator has an updated COT duration as time passes.

The target UE may request COT-sharing from a neighboring UE. This request can be performed by raising a flag in 1st-stage SCI or 2nd-stage SCI. Alternatively, this request can be performed by a MAC CE or RRC signaling. Once this signaling is known by at least one neighboring UE, the neighboring UE can advertise a COT-sharing opportunity once it acquires a channel by broadcasting a specific COT-sharing group ID in 1st- or 2nd-stage SCI. COT-sharing group IDs may be pre-configured and known to all SL UEs. Only a subset of the SL UEs that share the same group ID may share COT with each other. Alternatively, the trigger for COT-sharing can be proactive and begin once specific conditions are met (e.g., a channel busy ratio (CBR) level or when there are neighboring UEs with future reservations that can be accommodated by the available COT).

Referring back to FIG. 5, at 506, the target UE determines whether COT-sharing is possible. Specifically, the target UE may perform several checks to assess whether a COT-sharing opportunity from the initiator UE can be leveraged.

TABLE 1

| Example of SL COT indicator: | | |
| --- | --- | --- |
| Slot 1 | Slot 2 | Slot N |

Sub-band 1: COT duration indicator 1, COT duration indicator 2, . . . , COT duration indicator N.
Sub-band 2: COT duration indicator 1, COT duration indicator 2, . . . , COT duration indicator N.

. . .

Sub-band N: COT duration indicator 1, COT duration indicator 1, . . . , COT duration indicator N.

In particular, the UE may determine whether regulatory rules are met, and whether enhanced mode-2 resource selection aspects are met.

With respect to regulatory rules, the target UE may check the received COT-sharing indicator from the initiator UE against the pre-defined COT-sharing rules. The COT-sharing rules may also be signaled as part of the COT-sharing indicator. There may be different types of COT-sharing between the initiator UE and neighboring UEs in SL over an unlicensed band of 5 GHz or 6 GHz band. A COT consists of one or more transmissions of an initiator UE and zero or more transmissions of one or more responding UEs. There are SL unicast, group-cast, and broadcast communications between initiator UEs and neighboring UEs. Therefore, the following types of SL COT-sharing rules may be taken into account.

For SL unicast, SL COT-sharing is similar to COT-sharing in a Uu interface (i.e., an interface between universal mobile telecommunication service (UMTS) Terrestrial Radio Access Network (UTRAN) and the UE). The initiator UE may only share the COT duration with the target UE, but not other neighboring UEs. Also, the target UE may only use this COT-sharing to send SL data to the initiator UE.

For SL group-cast, the initiator UE may only share the COT duration with the target UEs, but not other neighboring UEs. For distance-based group-cast, only neighboring UEs within a defined distance from the initiator UE can share the COT with the initiator UE. Also, the target UEs in the group-cast can only use this COT-sharing to send SL data to the initiator UE.

For SL broadcast, the initiator UE can share the COT duration with all target UEs, but the target UEs in the broadcast can only use this COT-sharing to send SL data to the initiator UE.

If the COT-sharing rules are met, the target UE may check whether enhanced mode 2 resource selection aspects are met, as set forth below.

The target UE may check whether COT-sharing is suitable to accommodate the SL data transmission. For example, COT-sharing could be enabled for some SL data priority levels only (e.g., low latency SL traffic).

The target UE may check whether the COT-sharing opportunity includes a resource from the set of potential resources selected from the resource selection procedure of the target UE. This ensures that the target UE performs COT-sharing only on resources that were deemed suitable by the resource allocation procedure. This also ensures that COT-sharing does not affect backwards compatibility of the sensing-based resource selection procedure.

For SL groupcast, a UE may be able to share its COT with multiple neighboring UEs. For example, a cluster head can perform sub-channel acquisition and then share the COT with all or a subset of the members within the group.

For example, the initiator UE transmitting the COT-sharing indicator can indicate the duration of the available resources without specifying the UEs to transmit or their order. In this case, only the UEs with future reservations may share the COT based on the order of their future reservations within a specific future duration (e.g., the signaling window). For example, an initiator UE may transmit a COT-sharing indicator to 4 neighboring UEs (e.g., UEs A, B, C, and D). It is assumed that only UEs A, B, and C had future reservations that can fit within the resource indicated in the COT. The UEs will take turns in transmitting over the resources indicated by the COT based on the order of their future reservations. Note that in case a UE fails to transmit, the COT is considered lost and the UEs perform LBT to acquire the channel.

Referring back to FIG. 5, when it is determined that COT-sharing is possible, the UE transmits data with COT-sharing, at 508. The target UE randomly selects a resource from a subset of available resources for a COT-sharing based data transmission. The target UE may start the SL transmission in the selected resource without LBT-based channel access in some conditions (e.g., if a time gap between a last COT-sharing indicator of the initiator UE and the scheduled transmission from target UE is smaller than Y). The target UE may still need to perform one-shot Cat-2 LBT before SL transmission in the GP of a previous slot, if the time gap between the last COT-sharing indicator from the initiator UE and the scheduled transmission from target UE is larger than Y but smaller than X (X>Y).

When it is determined that COT-sharing is not possible, the target UE performs sensing-based resource selection, at 510, and a channel access technique with a contention window (Cat-4 LBT channel access) before transmission in the selected resource, at 512. The target UE transmits data on the selected resource without COT-sharing, at 514. When the target UE starts its data transmission, it may also act as an initiator UE and may also unicast/groupcast/broadcast its COT-sharing indicator to other potential target UE(s).

Figure 6:
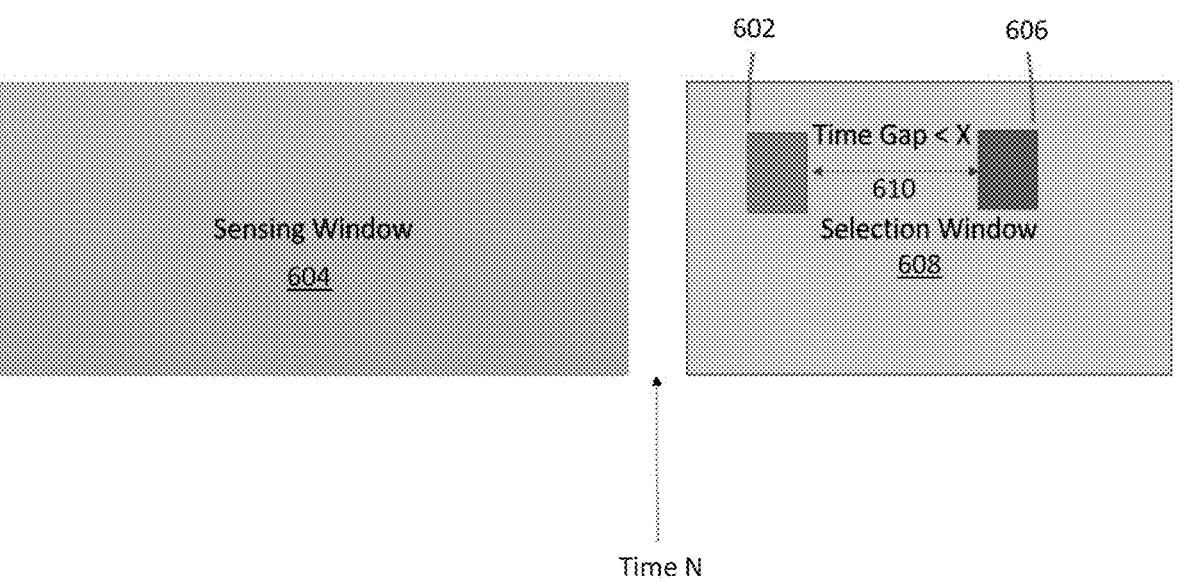
FIG. 6 is a diagram illustrating COT-sharing in which a COT-sharing indicator is received during a resource selection window, according to an embodiment.

FIG. 6 is a diagram illustrating COT-sharing in which a COT-sharing indicator is received during a resource selection window, according to an embodiment. It is assumed that a target UE has already selected a future resource with an LBT gap for initiating channel access. The target UE receives a COT-sharing indicator 602 from an initiator UE indicating a COT-sharing possibility after a sensing window 604 of the target UE, but before the target UE starts a scheduled transmission 606 in a selected resource of a resource selection window 608. The resource selected by target UE fits with the COT-sharing opportunities provided by the received COT-sharing indicator, both in time and frequency. For example, the received COT-sharing indicator indicates a set of resources available for COT-sharing, which includes the resource originally selected by the target UE. Then, the target UE can start data transmission in an originally selected resource without LBT, due to the COT-sharing provided by the initiator UE. A time gap 610 between the COT-sharing indicator 602 and the data transmission 606 is less than the threshold (X), as described above.

Figure 7:
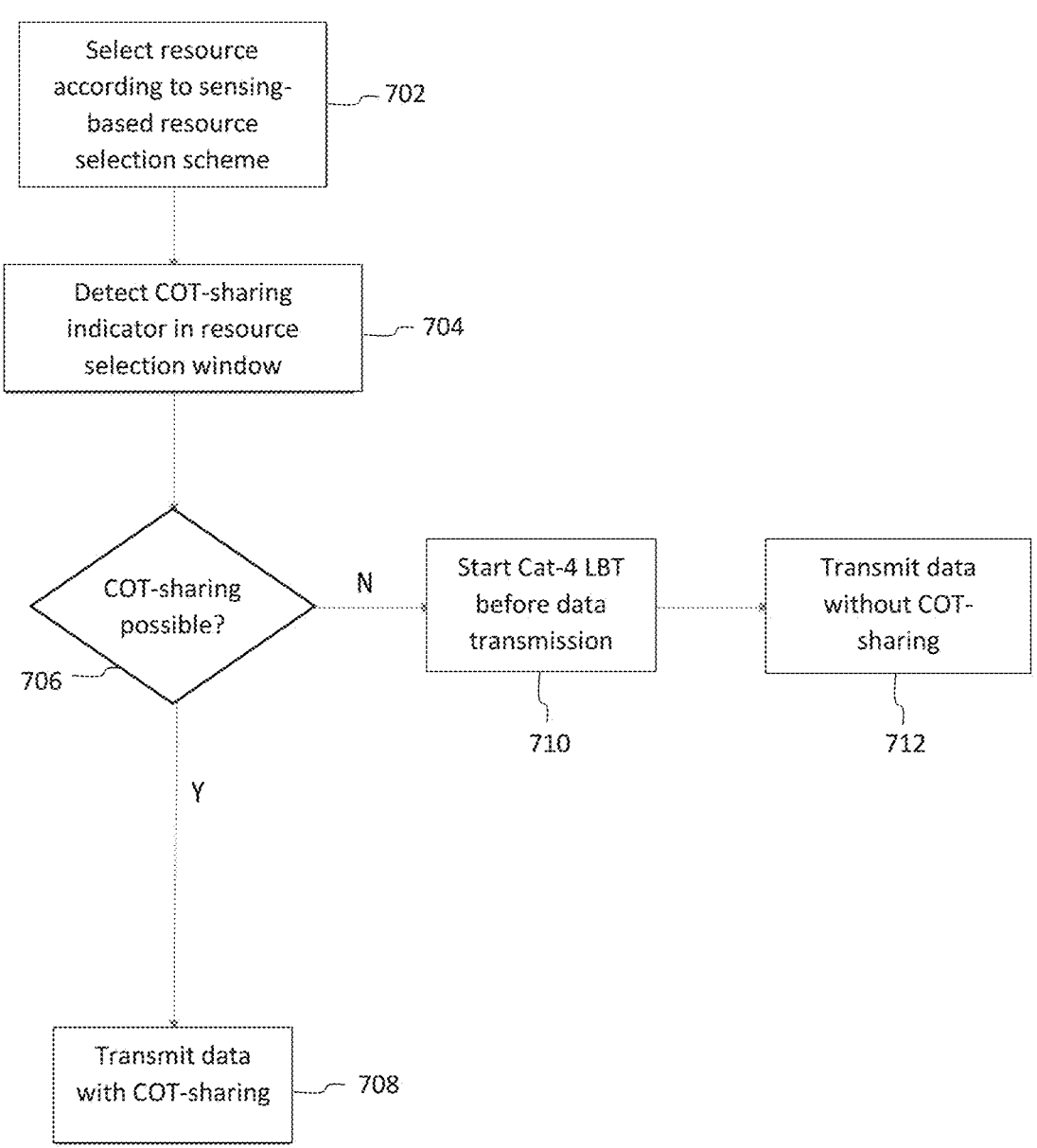
FIG. 7 is flowchart illustrating a method for COT-sharing in which the COT-sharing indicator is received during the resource selection window, according to an embodiment.

FIG. 7 is flowchart illustrating a method for COT-sharing in which the COT-sharing indicator is received during the resource selection window, according to an embodiment.

At 702, the target UE selects a resource according to the sensing-base resource selection scheme described above.

At 704, the target UE detect a COT-sharing indicator from an initiator UE in the resource selection window, which is part of the observation window described above. A detailed description of COT-sharing indicator detection is described in detail above with respect to 504 of FIG. 5.

At 706, the target UE determines whether COT-sharing possible. The target UE first determines whether regulatory rules are being met, which is described in detail above with respect to 506 of FIG. 5.

The target UE also determines whether the enhanced mode-2 resource selection aspects are being met. As shown in FIG. 6, it is assumed that the target UE has already selected a future resource with the LBT gap for initiating channel access. The target UE then receives one or several SCIs from other UEs indicating the COT-sharing possibility after its sensing window, but before the target UE starts the transmission in the selected resource. The resource selected by target UE fits with the COT-sharing opportunities provided by the received COT-sharing indicators. For example, as shown in FIG. 6, the received COT-sharing indicator indicates a set of resources available for COT-sharing that includes the resource originally selected by the target UE. The target UE may then start data transmission in the originally selected resource without LBT, due to the COT-sharing provided by the initiator UE.

Referring back to FIG. 7, if the target UE determines that COT-sharing is possible, the target UE transmits data with COT-sharing, at 708. The target UE may start the SL transmission in the originally select resource without LBT-based channel access, in some conditions, as described above in FIG. 5.

If the UE determines that COT-sharing is not possible, the target UE performs Cat-4 LBT channel access before transmission in the selected resource, at 610. After successfully obtaining the channel, the target UE starts data transmission, at 612. The target UE may also act as an initiator UE and unicast/groupcast/broadcast its own COT-sharing indicator to other potential target UEs.

In another embodiment, if the SL UE does not receive any COT-sharing indicators in the observation window, the target UE starts the Cat-4 LBT with a back-off timer that is selected from [0, CW] on the one or more LBT sub-bands depending on the size of the frequency and time resource allocated by the gNB or selected via sensing-based resource selection scheme.

In another embodiment, the selected frequency resource size, in terms of number of sub-channels, is less than or equal to the size of the LBT sub-band, and the LBT bandwidth is one sub-band. Otherwise, the Cat-4 LBT is performed on multiple sub-bands, which has a summed bandwidth that is larger than or equal to the selected SL frequency resource size in terms of number of sub-channels, according to multi-channel LBT Cat-4 channel access scheme A or B defined in 3GPP TS 37.213. If the SL UE's LBT is successful or the back-off timer reaches 0, it broadcasts a COT-sharing indicator to neighboring UEs. Otherwise, SL UE continues with CCA sensing at every symbol and decrements a back-off timer by 1 when a sensed sub-band is idle. The SL UE either unicasts, group-casts, or broadcasts the data packets to destination UEs.

Figure 8:
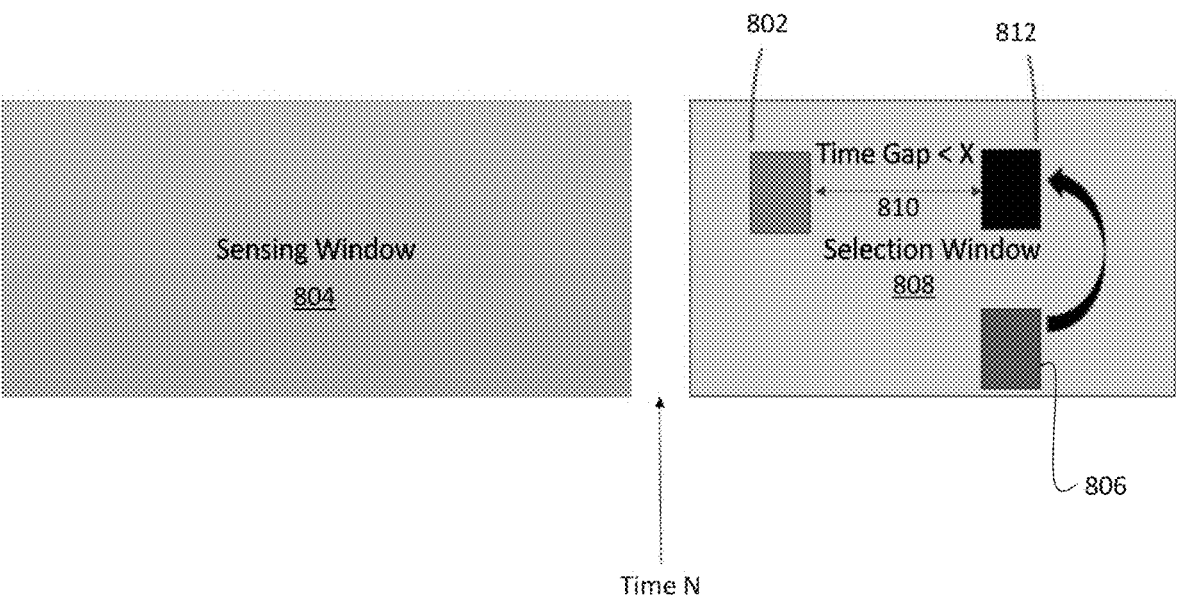
FIG. 8 is a diagram illustrating COT-sharing in which a COT-sharing indicator is received during a resource selection window, according to an embodiment.

FIG. 8 is a diagram illustrating COT-sharing in which a COT-sharing indicator is received during a resource selection window, according to an embodiment. A target UE selected a future resource 806 with the LBT gap for initiating the channel access. The target UE receives an SOC-sharing indicator 802 from an initiator UE, after a sensing window 804 of the target UE, but before a latest time that target UE is able to re-select a resource. However, the resource 806 selected by the target UE does not fit within the COT-sharing opportunities provided by the received COT-sharing indicator 802. For example, as shown in FIG. 8, the received COT sharing-indicator 802 indicates a set of resources available for COT-sharing that does not include the resource 806 originally selected by the target UE (e.g., due to the resource being on a different subchannel or due to a large time gap). In this case, the target UE may trigger resource re-selection to find a new resource 812 that is included in the set of resources available for COT-sharing from the received COT-sharing indicator 802, and is not excluded from the sensing-based resource selection scheme. If it can find such a new resource, the target UE may transmit data in the new resource 812 without LBT. Otherwise, the target UE maintains the original selected resource 806 for future transmission and performs LBT channel access before starting the data transmission. A time gap 810 between the COT-sharing indicator 702 and the data transmission 712 is less than the threshold (X), as described above.

Figure 9:
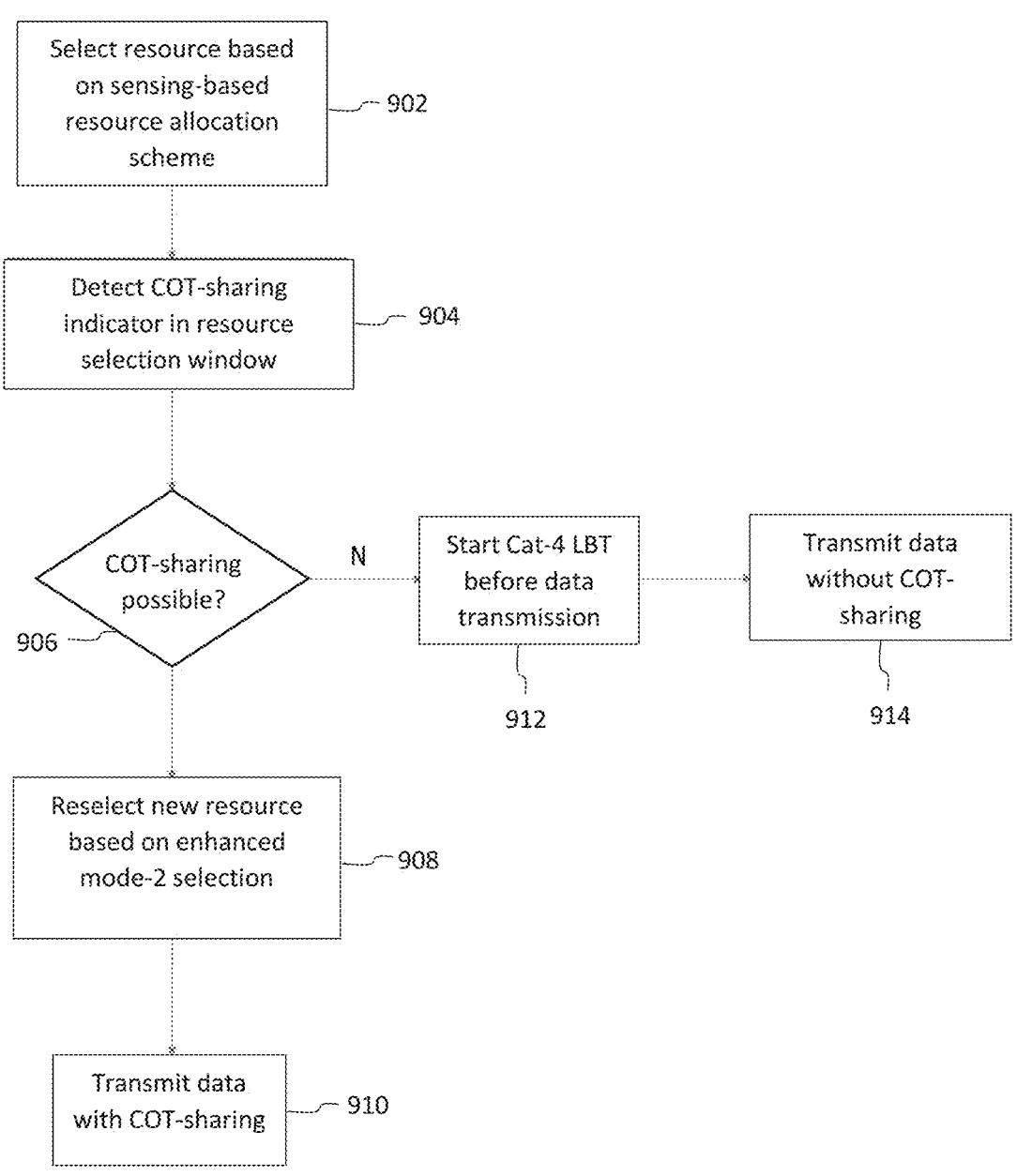
FIG. 9 is a flowchart illustrating a COT-sharing method in which the COT-sharing indicator is received during the resource selection window, according to an embodiment.

FIG. 9 is a diagram illustrating the COT-sharing method in which the COT-sharing indicator is received during the resource selection window, according to an embodiment.

At 902, the target UE selects a resource according to the sensing-based resource selection scheme.

At 904, the target UE detects a COT-sharing indicator from at least one initiator UE in a resource selection window of the sensing-based resource selection scheme, which is part of the observation window described above. A detailed description of COT-sharing indicator detection is provided above with respect to 504 of FIG. 5.

At 906, the target UE determines whether COT-sharing possible. The UE checks whether regulatory rules and enhanced mode-2 aspects are met, which is described in detail above with respect to 706 of FIG. 7.

If the target UE determines that COT-sharing is possible, the target UE re-selects a new resource based on enhanced mode-2 selection, at 908, and transmits data with COT-sharing, at 910. Specifically, the target UE may start the SL data transmission in the re-selected resource without LBT-base channel access, in some conditions, as described above.

If the UE determines that COT-sharing is not possible, the target UE performs Cat-4 LBT channel access before transmission in the originally selected resource, at 912. After successfully obtaining the channel, the target UE starts data transmission, at 914. The target UE may also act as an initiator UE and unicast/groupcast/broadcast its COT-sharing indicator to other potential target UEs.

In an embodiment, if the target UE receives one COT-sharing indicator in the observation window, and the remaining COT duration in the COT-sharing indicator cannot accommodate the SL data transmission over selected or allocated resource by this UE (e.g., the time domain of the selected resource exceeds the max COT duration), then this UE re-selects or re-requests a new SL grant of the SL resource with an LBT gap before the data transmission slot. The UE then performs Cat-4 LBT in the LBT gap to initiate the SL COT before the SL data transmission. If LBT fails, this SL UE may defer its data transmission and start the back-off timer. When the back-off timer expires and a fixed time duration for which the sensed channel is idle, the channel access is successful. If this point of time is still within the LBT gap duration, the UE transmits dummy data to capture the channel before starting the data transmission in the next slot. Alternatively, if the UE capability allows, while in the back-off state, the SL UE can also monitor the COT-sharing indicators from other potential neighboring UE that initiated channel access for SL communications. If this SL UE detects a COT-sharing indicator with the remaining COT duration that can accommodate the SL UE's reselected or re-granted SL resource, the SL UE can end the back-off timer and start SL transmission over the reselected or re-granted SL resource within the remaining COT duration from the other initiator UE.

If the SL UE receives one COT-sharing indicator in the observation window, and the remaining COT duration in the COT-sharing indicator can accommodate the data transmission over the selected or allocated resource by this UE, then this UE does not need to perform Cat-4 LBT to initiate the COT-sharing before the SL data transmission. Instead, this UE may need to perform Cat-2 LBT if the time gap between the current SL transmission and the previous SL transmission from other SL COT sharing UE in the same COT is larger than or equal to a pre-configured threshold. The UE may perform Cat-1 LBT or no LBT at all, if the time gap between the current SL data transmission and the previous SL data transmission from another SL COT-sharing UE in the same COT is smaller than a pre-configured threshold.

For SL unicast, it may be assumed that a target UE already selected a future resource with the LBT gap. It then receives one or several SCIs from other initiator UEs indicating the COT-sharing possibility. If the selected resource is within the maximum shared COT duration and has the time gap<X between starting actual target UE's transmission and the end of the last initiator UE's transmission, the target UE then can perform one of the following options.

As a first option, if only one COT-sharing indicator is received, the data transmission may be performed on the resources indicated by the COT-sharing indicator if they can accommodate the transport block (TB) and subsequently release the reserved resource if no additional retransmission is needed and there is no pending TBs for transmission. The transmitted TB can be either targeted towards the UE that signaled the COT-sharing indicator or to any other neighboring UE. To release the reserved future resource, the UE can indicate, the reserved resource using the time/frequency indication in the SCI, along with a raised flag (either in 1st- or 2nd-stage SCI) to indicate the release of this resource. The release of the resource may also release the reserved LBT gap preceding the resource such that it can be used by neighboring UEs.

As a second option, if only one COT-sharing indicator is received, the transmission may be performed on the resources indicated by the COT indicator if they can accommodate the TB without releasing the future reserved resources. Subsequently, the UE can either transmit in the future reserved resources(s) or skip the transmission if there are no pending TBs.

As a third option, if multiple COT-sharing indicators are received, the UE can identify the indicators that can accommodate the TB intended for the transmission, and then prioritize the received indicators based on their starting point in time. The UE may transmit on the resources earliest in time that are signaled by the COT-sharing indicator. Alternatively, the UE can randomly select one of the resources indicated by the COT-sharing indicators.

An additional issue that may prevent COT-sharing is the guard symbol in the existing slot structure of NR SL, which may have a duration that exceeds the max time gap for COT-sharing. For example, a guard symbol duration is 1 ms/14=71.4 μs, when SCS 15 kHz, 35.07 μs, when SCS 30 kHz, and 17.5 μs, when SCS 60 kHz.

Thus, a gap symbol can be larger than 25 μs max time gap in COT-sharing when SCS is 15 and 30 kHz. In this case, Cat-1 LBT is required to transmit in the 2nd slot even if LBT is already successful in the 1st slot, which is not efficient. Cyclic prefix (CP) extension employed in NR-U R-16 can be re-used to compensate for the gap of the GP. In particular, an automatic gain control (AGC) symbol of the $2^{nd}$ slot may be extended to start transmission in part of the GP of the $1^{st}$ slot, such that the time gap from the GP is less than the max time gap for the COT-sharing.

The 1st-stage or 2nd-stage SCI may include the field of "ChannelAccess_CPext". It may also indicate the LBT mode (e.g., one short LBT type A or B) used by the responding UEs for COT-sharing. Alternatively, a CP-ext parameter can be signaled as part of the resource pool configuration using RRC signaling. In this case, once a UE operating in a resource pool detects a COT-sharing indication, it may automatically apply the corresponding CP_ext based on the resource pool configuration.

Figure 10:
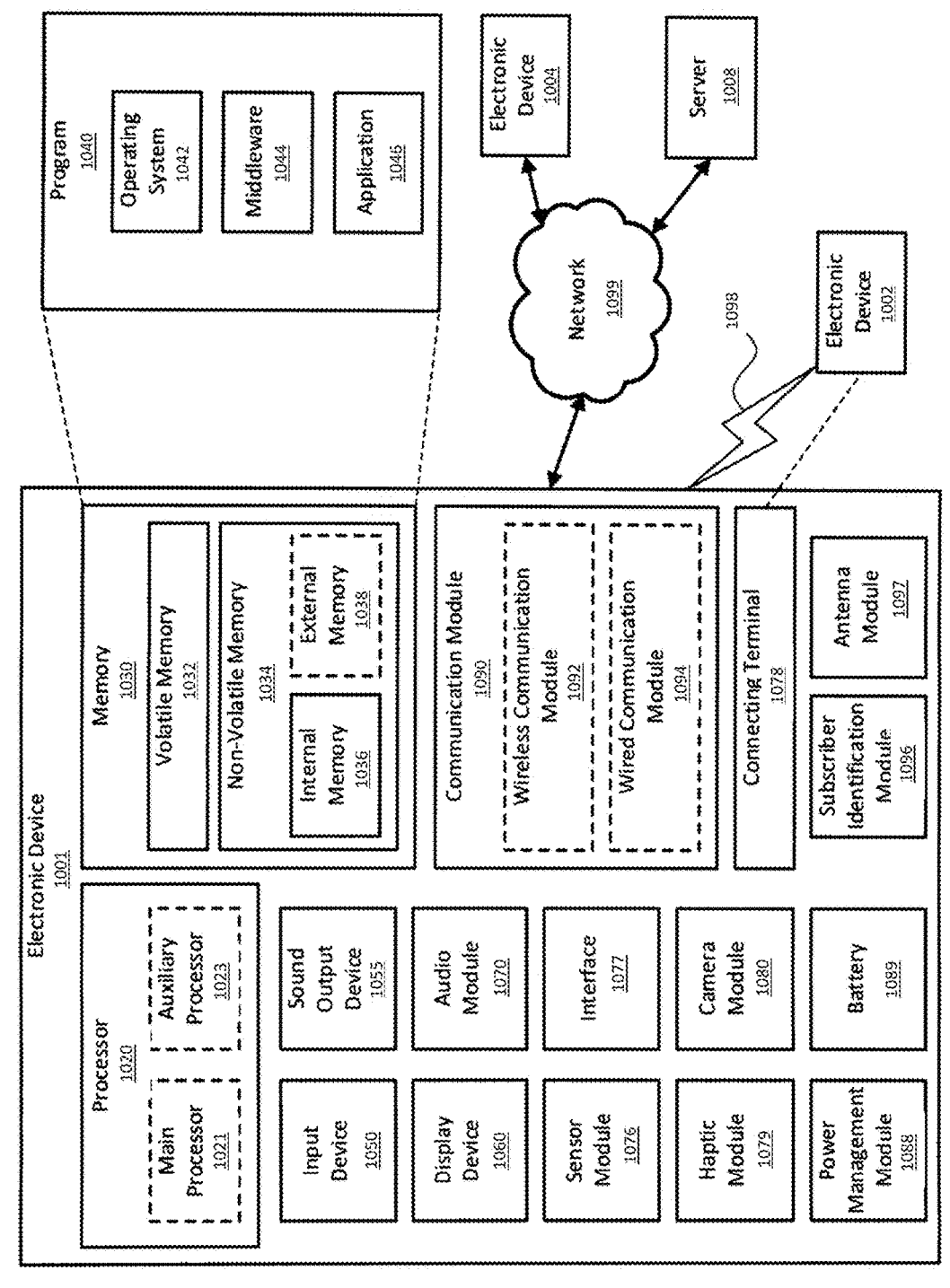
FIG. 10 is a block diagram of an electronic device in a network environment, according to an embodiment.

FIG. 10 is a block diagram of an electronic device in a network environment 1000, according to an embodiment.

Referring to FIG. 10, an electronic device 1001 in a network environment 1000 may communicate with an electronic device 1002 via a first network 1098 (e.g., a short-range wireless communication network), or an electronic device 1004 or a server 1008 via a second network 1099 (e.g., a long-range wireless communication network). The electronic device 1001 may communicate with the electronic device 1004 via the server 1008.

The electronic device 1001 and the electronic device 1002 may be embodied as UEs 106 and 108 of FIG. 1, and as a target UE or an initiator UE described above with respect to FIGS. 2-9. The first network 1098 may be embodied as the SL 110 of FIG. 1 between target and initiator UEs 106 and 108.

The electronic device 1001 may include a processor 1020, a memory 1030, an input device 1040, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) card 1096, or an antenna module 1094. In one embodiment, at least one (e.g., the display device 1060 or the camera module 1080) of the components may be omitted from the electronic device 1001, or one or more other components may be added to the electronic device 1001. Some of the components may be implemented as a single integrated circuit (IC). For example, the sensor module 1076 (e.g., a fingerprint sensor, an iris sensor, or an illuminance sensor) may be embedded in the display device 1060 (e.g., a display).

The processor 1020 may execute software (e.g., a program 1040) to control at least one other component (e.g., a hardware or a software component) of the electronic device 1001 coupled with the processor 1020 and may perform various data processing or computations.

As at least part of the data processing or computations, the processor 1020 may load a command or data received from another component (e.g., the sensor module 1046 or the communication module 1090) in volatile memory 1032, process the command or the data stored in the volatile memory 1032, and store resulting data in non-volatile memory 1034. The processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or execute a particular function. The auxiliary processor 1023 may be implemented as being separate from, or a part of, the main processor 1021.

The auxiliary processor 1023 may control at least some of the functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). The auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input device 1050 may receive a command or data to be used by another component (e.g., the processor 1020) of the electronic device 1001, from the outside (e.g., a user) of the electronic device 1001. The input device 1050 may include, for example, a microphone, a mouse, or a keyboard.

The sound output device 1055 may output sound signals to the outside of the electronic device 1001. The sound output device 1055 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. The display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. The audio module 1070 may obtain the sound via the input device 1050 or output the sound via the sound output device 1055 or a headphone of an external electronic device 1002 directly (e.g., wired) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. The sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device 1002 directly (e.g., wired) or wirelessly. The interface 1077 may include, for example, a high-definition multimedia interface (HDMI), a universal serial bus (USB) interface, a secure digital (SD) card interface, or an audio interface.

A connecting terminal 1078 may include a connector via which the electronic device 1001 may be physically connected with the external electronic device 1002. The connecting terminal 1078 may include, for example, an HDMI connector, a USB connector, an SD card connector, or an audio connector (e.g., a headphone connector).

The haptic module 1079 may convert an electrical signal into a mechanical stimulus (e.g., a vibration or a movement)

or an electrical stimulus which may be recognized by a user via tactile sensation or kinesthetic sensation. The haptic module 1079 may include, for example, a motor, a piezoelectric element, or an electrical stimulator.

The camera module 1080 may capture a still image or moving images. The camera module 1080 may include one or more lenses, image sensors, image signal processors, or flashes. The power management module 1088 may manage power supplied to the electronic device 1001. The power management module 1088 may be implemented as at least part of, for example, a power management integrated circuit (PMIC).

The battery 1089 may supply power to at least one component of the electronic device 1001. The battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the AP) and supports a direct (e.g., wired) communication or a wireless communication. The communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or a standard of the Infrared Data Association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. The antenna module 1097 may include one or more antennas, and, therefrom, at least one antenna appropriate for a communication scheme used in the communication network, such as the first network 1098 or the second network 1099, may be selected, for example, by the communication module 1090 (e.g., the wireless communication module 1092). The signal or the power may then be transmitted or received between the communication module 1090 and the external electronic device via the selected at least one antenna.

Commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. All or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Additionally or alternatively, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method comprising:

receiving, at a first user equipment (UE), a channel occupancy time (COT)-sharing indicator from a second UE;

determining, by the first UE, whether a time-frequency resource is within a frequency range indicated by the COT-sharing indicator received from the second UE, and whether the first UE is able to use the time-frequency resource;

in case that the first UE is able to use the time-frequency resource within the frequency range, transmitting data with COT-sharing between the first UE and at least the second UE; and in case that the first UE is unable to use the time-frequency resource within the frequency range, transmitting the data without COT-sharing in a first resource selected by the first UE, wherein the COT-sharing indicator is received in a sidelink (SL) between the first UE and the second UE, and wherein the COT-sharing indicator is signaled in $1^{st}$-stage SL control information (SCI) over physical SL control channel (PSCCH) or $2^{nd}$-stage SCI over physical SL shared channel (PSSCH).

2. The method of claim 1, wherein, in case that the first UE is able to use the time-frequency resource in the frequency range, the method further comprises selecting, by the first UE, the time-frequency resource from a set of candidate resources identified by a physical layer in a mode 2 sidelink resource selection procedure of the first UE.

3. The method of claim 1, wherein the COT-sharing indicator is in a format indicating frequency sub-bands and time slots that are part of a corresponding COT duration.

4. The method of claim 1, wherein the COT-sharing indicator is received within an observation window prior to a scheduled time for transmission of the data from the first UE and within at least one of a sensing window and a resource selection window of a sensing-based resource selection procedure of the first UE.

5. The method of claim 4, wherein:
the COT-sharing indicator is received within the sensing window of the sensing-based resource selection procedure of the first UE; and
in case that the first UE is able to use the time-frequency resource in the frequency range, the data is transmitted with COT-sharing in the first resource that is within the frequency range indicated by the COT-sharing indicator.

6. The method of claim 4, wherein the COT-sharing indicator is received within the resource selection window of the sensing-based resource selection procedure of the first UE.

7. The method of claim 6, wherein, in case that the first UE is able to use the time-frequency resource in the frequency range:
the data is transmitted with COT-sharing in the first resource that is within the frequency range indicated by the COT-sharing indicator; or
the method further comprises:
selecting a second resource in the resource selection window for data transmission based on the COT-sharing indicator, wherein the second resource is within the frequency range indicated by the COT-sharing indicator; and
transmitting the data with COT-sharing in the second resource, wherein the second resource is different than the first resource.

8. The method of claim 1, wherein:
in case that the first UE is unable to use the time-frequency resource in the frequency range, the method further comprises performing a channel access technique using a contention window to transmit the data without COT-sharing.

9. The method of claim 1, wherein determining whether the first UE is able to use the time-frequency resource in the frequency range comprises at least one of comparing the COT-sharing indicator to pre-defined COT-sharing rules, determining whether COT-sharing can accommodate transmission of the data, or determining whether COT-sharing includes a resource previously selected for transmission by the first UE.

10. A first user equipment (UE) comprising:
a processor; and
a non-transitory computer readable storage medium storing instructions that, when executed, cause the processor to:
receive a channel occupancy time (COT)-sharing indicator from a second UE;
determine whether a time-frequency resource is within a frequency range indicated by the COT-sharing indicator received from the second UE, and whether the first UE is able to use the time-frequency resource;
in case that the first UE is able to use the time-frequency resource within the frequency range, transmit data with COT-sharing between the first UE and at least the second UE; and
in case that the first UE is unable to use the time-frequency resource within the frequency range, transmit the data without COT-sharing in a first resource selected by the first UE,
wherein the COT-sharing indicator is received in a sidelink (SL) between the first UE and the second UE, and wherein the COT-sharing indicator is signaled in $1^{st}$-stage SL control information (SCI) over physical SL control channel (PSCCH) or $2^{nd}$-stage SCI over physical SL shared channel (PSSCH).

11. The UE of claim 10, wherein, in case that the first UE is able to use the time-frequency resource in the frequency range, the instructions further cause the processor to select the time-frequency resource from a set of candidate resources identified by a physical layer in a mode 2 sidelink resource selection procedure of the first UE.

12. The UE of claim 10, wherein the COT-sharing indicator is in a format indicating frequency sub-bands and time slots that are part of a corresponding COT duration.

13. The first UE of claim 10, wherein the COT-sharing indicator is received within an observation window prior to a scheduled time for transmission of the data from the first UE and within at least one of a sensing window and a resource selection window of a sensing-based resource selection procedure of the first UE.

14. The first UE of claim 13, wherein:
the COT-sharing indicator is received within the sensing window of the sensing-based resource selection procedure of the first UE; and
in case that the first UE is able to use the time-frequency resource in the frequency range, the data is transmitted with COT-sharing in the first resource that is within the frequency range indicated by the COT-sharing indicator.

15. The first UE of claim 14, wherein the COT-sharing indicator is received within the resource selection window of the sensing-based resource selection procedure of the first UE, and, in case that the first UE is able to use the time-frequency resource in the frequency range;
the data is transmitted with COT-sharing in the first resource that is within the frequency range indicated by the COT-sharing indicator; or
the instructions further cause the processor to:
select a second resource in the resource selection window for data transmission based on the COT-sharing indicator, wherein the second resource is within the frequency range indicated by the COT-sharing indicator; and
transmit the data with COT-sharing in the second resource, wherein the second resource is different than the first resource.

16. The first UE of claim 10, wherein:
in case that the first UE is unable to use the time-frequency resource in the frequency range, the instructions further cause the processor to perform a channel access technique using a contention window to transmit the data without COT-sharing.

17. The first UE of claim 10, wherein, in determining whether the first UE is able to use the time-frequency resource in the frequency range, the instructions further cause the processor to, at least one of, compare the COT-sharing indicator to pre-defined COT-sharing rules, determine whether COT-sharing can accommodate transmission of the data, or determine whether COT-sharing includes a resource previously selected for transmission by the first UE.

18. A communication system comprising:
a first user equipment (UE) comprising a processor configured to:
transmit a channel occupancy time (COT)-sharing indicator to one or more other UEs in a sidelink; and a second UE comprising a processor configured to:

receive the COT-sharing indicator from the first UE;

determine whether a time-frequency resource is within a frequency range indicated by the COT-sharing indicator received from the second UE, and whether the first UE is able to use the time-frequency resource;

in case that the first UE is able to use the time-frequency resource within the frequency range, transmit data with COT-sharing between the first UE and at least the second UE; and in case that the first UE is unable to use the time-frequency resource within the frequency range, transmit the data without COT-sharing in a resource selected by the first UE, wherein the COT-sharing indicator is received in a sidelink (SL) between the first UE and the second UE, and wherein the COT-sharing indicator is signaled in $1^{st}$-stage SL control information (SCI) over physical SL control channel (PSCCH) or $2^{nd}$-stage SCI over physical SL shared channel (PSSCH).

\* \* \* \* \*